Dec. 31, 1968  H. SCHIERHOLT  3,419,754
SPARK EROSION MACHINERY WITH SPARK CONTROLLING FEEDBACK
CIRCUITRY SENSING GAP CONDITIONS
Filed Jan. 13, 1966

Inventor:
Hans Schierholt
By Cushman, Darby & Cushman
Attorneys

United States Patent Office 3,419,754
Patented Dec. 31, 1968

3,419,754
SPARK EROSION MACHINERY WITH SPARK CONTROLLING FEEDBACK CIRCUITRY SENSING GAP CONDITIONS
Hans Schierholt, Iserlohn, Germany, assignor to AEG-Elotherm G.m.b.H., Remscheid-Hasten, Germany
Filed Jan. 13, 1966, Ser. No. 520,526
Claims priority, application Germany, Jan. 16, 1965, A 48,137
5 Claims. (Cl. 315—227)

ABSTRACT OF THE DISCLOSURE

The invention relates to a control circuit for controlling the eroding discharge across a spark eroding gap between a workpiece and a working electrode in a spark erosion machine whereby a voltage surge is produced when a source of direct current causes a discharge across the gap which can not be maintained, the magnitude of the surge reflecting the presence or absence of a desired condition in the gap and the surge triggering an erosion pulse generator to cause an eroding discharge when the desired condition is present. In one embodiment, a serially connected capacitor and resistor are connected across the gap to produce the voltage surge when the discharge which can not be maintained occurs, the magnitude of the surge then being a function of the voltage across the gap at the time of discharge.

---

This invention relates to a circuit arrangement for operating a spark erosion machine comprising a pulse generator which does not rely on energy storage means, i.e. a triggered pulse generator.

Such triggered pulse generators particularly since the development of semiconductor techniques which now permit simple, reliable and efficient forms of construction to be devised, have gained considerably in popularity for operating spark erosion machines. Such triggered pulse generators comprise a time base, for instance in the form of a multivibrator, which can be flexibly adjusted to the generation of pulses of fixed length and pulse frequency. The advantages gained primarily consist in the fact that unipolar pulses can be generated which in shape and frequency can be readily adapted to any particular kind of machining problem. An erosive performance coupled with a low wear of the tools can now be achieved to a degree which would have been entirely unattainable with generators previously known in the art.

One disadvantage of their use in spark erosion machines is that in the course of a machining operation the working gap is subjected to the effect of various factors depending upon its geometric shape and the degree of contamination of the liquid working medium, and that it is therefore sometimes incapable of satisfactorily using pulses which arrive at a rigidly uniform rate. A particularly undesirable situation may arise when the working gap fails to deionize fully between consecutive pulses. The next discharge will not then occur at a fresh point, but it will take place at the same point as before forming a continuation of the preceding spark discharge. This leads to the generation of holes in an otherwise smoothly worked surface, to localised heating and to the formation of cracks.

The difficulty inherent in this situation is that the feed control means or any known short circuit cut-outs cannot distinguish between a desirable sequence of individual spark discharges that are evenly distributed across the work surface, and a sequence of discharges in which the current continues to flow through the same path. Consequently damage due to this cause cannot be prevented or mitigated. If the difficulty were to be overcome by slowing down the pulse repetition rate sufficiently for the intervals between pulses to be long enough for deionization under the most adverse conditions, then the rate of material removal would be very substantially less.

In conventional free running relaxation oscillators, in which a storage capacitor is charged through a resistor, possibly in series with an inductance, the above mentioned undesirable operating conditions do not occur because the storage capacitor cannot be charged until the working gap is deionised. On the other hand, relaxation type generators have other well known drawbacks, such as the risk of sustaining permanent arcing, generating pulse shapes that are difficult to control and having relatively long intervals between consecutive discharges, so that on balance they are inferior to triggered pulse generators of the type hereinbefore described.

In order to overcome the above described difficulties which arise in triggered pulse generators, it has already been proposed to provide a supplementary low power pulse generator for the generation of test discharges at a fixed repetition rate in synchronism with the time base. The test pulses explore the working gap to determine whether the conditions therein are suitable for the working discharges. The working pulse from the main energy source is not released unless the result of the exploration is positive. However, this known arrangement is somewhat complex, and it may not be desirable to tie the sequence of sparks to a fixed repetition rate. Furthermore, in this prior arrangement the derivation of suitable quantities for controlling the feed is complicated.

For achieving a similar result to that obtained by this known arrangement but with simplified means and with the avoidance of a fixed repetition rate, it has also been proposed in our German Patent specification No. 2523/65 to replace the trigger pulse generator for generating exploring pulses by means which continuously monitor the working gap without being dependent upon a prescribed fixed repetition frequency. FIGURE 1 of the drawings accompanying the present specification illustrates the principle of this arrangement. Permanently connected to the work 3 and the working electrode 4 is a source of direct current 8 which has an internal resistance sufficiently high that it is incapable of maintaining an independent discharge. The working gap 6 and this internal resistance 11 of the test voltage source constitute a voltage potential divider. Consequently a voltage $u_f$ cannot build up in the capacitor 16 which parallels the working gap and which may be constituted by the unavoidable circuit capacitance possibly supplemented by an additional capacitor, unless the resistance across the working gap 6 is very high. Thus if the voltage $u_f$ across the working gap exceeds a given value, say 40 volts, then this means that the working gap is satisfactorily clean and deionized. The measuring circuit 12, for instance a Schmitt comparator, will then generate the next pulse when this voltage $u_f$ exceeds 40 volts.

This circuit is very simple in construction and the spark repetition frequency can automatically adjust itself to the maximum rate permitted by the conditions obtaining in the working gap, no fixed repetition frequency being prescribed. However, an inconvenience which does still remain is that the derivation of a suitable reference quantity for controlling the feed within a major working range is still complicated. Use could be made for this purpose for instance of the peak voltage $u_f$ across the working gap but this persists for only a very short period of time and must be picked off by a very high ohmic feeler and stored until the next discharge takes place. Further, should the working gap be excessively wide it is possible for a pulse to be triggered without a discharge taking place, which is also undesirable.

It is the object of the present invention to overcome these disadvantages and further to improve and simplify the circuit arrangement for spark erosion machines.

In the arrangement illustrated in FIGURE 1 the voltage $u_f$ across a working gap 6 which is optimal for erosive machining rises exponentially when a discharge has taken place and the gap has been deionized. When this voltage reaches say 40 volts a pulse is triggered in the pulse generator, resulting in a practically instantaneous further rise of the voltage $u_f$ to say 70 volts which causes a fresh discharge. The invention is based on the fact that if no pulse were triggered when the 40 volt level is reached, the voltage continues to rise exponentially and a discharge across the working gap would take place when a sufficiently high voltage, e.g., the above mentioned 70 volt level, had thus been reached. The voltage $u_f$ then suddenly collapses, producing a well-defined voltage surge which is illustrated graphically in FIGURE 2 of the accompanying drawings. This voltage surge can readily be transmitted through a blocking capacitor in the form of a fine needle-shaped pulse, the amplitude of which will depend upon the magnitude of the voltage $u_f$ that had previously been built up, and it provides a more reliable reference quantity for the desired physical condition of the working gap than the magnitude of the voltage that builds up across the gap, and which may be used for controlling the triggered pulse generator. Since a discharge from current source 8 will not take place at all when the discharge gap is too wide, a trigger pulse generator thus controlled will not produce a pulse under these conditions.

The invention therefore consists of a circuit arrangement for a spark erosion machine, consisting essentially of a trigger pulse generator and a DC voltage source connected across conductors leading to the work and the electrode through a resistor sufficiently high to prevent an independent charge across the gap between the work and electrode being sustained, a measuring member adapted to receive a voltage surge from the working gap which is characteristic of the desired condition in the gap, a capacitor and a resistor in series with each other between the working gap and the said measuring member adapted to supply a voltage surge to the said measuring member which is a function of the voltage built up across the working gap prior to a discharge across the working gap, the said measuring member being operative to trigger the release of a fresh erosion pulse in the generator only if the amplitude of the voltage surge exceeds a value characteristic of a desired condition in the working gap.

The measuring element is adapted not to trigger a fresh working pulse in the generator until the amplitude of the voltage surge which it receives exceeds a value characteristic of the existence of the desired conditions in the working gap.

The circuit arrangement of the invention simplifies previously proposed arrangements. Since the pulse generating device in the trigger circuit is usually a monostable multivibrator, sometimes referred to as a mono-flip-flop, which responds to a defined trigger voltage, it is capable of also performing the measuring functions. The triggering voltage may then be the voltage surge generated when the spark is initiated or an adjustable fraction of the said surge, no fresh erosion pulse being generated unless the amplitude of the voltage surge exceeds a predetermined value, for instance a value of 30 volts, which is characteristic of the existence of the desired conditions in the working gap.

The arrangement of the invention functions like a combination of a free running relaxation oscillator and a controlled trigger circuit, combining the advantages of both systems and eliminating their separate disadvantages. Thus the repetition rate of the sparks is not rigidly constant but adjusts itself automatically in optimum manner to the conditions obtaining in the working gap, as is the case to some extent when a relaxation type generator is used. Control and regulating means used with relaxation type generators, for using variations in the spark repetition rate during operation can therefore also be used in the present arrangement without causing particular difficulties due to the necessities of adapting them specially. Also the discharging current is unipolar and within a wide range of variability its shape is selectable, due to the fact that a trigger circuit is used. The undesirable transmission of current due to short circuits, the generation of a permanent arc or a sequence of discharges along the same path are impossible with the arrangement of the invention.

Further, compared with previously proposed circuit arrangements, it has the advantage that the instant of pulse initiation always coincides with the spark. The sparking gap therefore completely controls the repetition rate.

As hereinbefore mentioned, the voltage $u_f$ across the working gap as a function of time is illustrated in FIGURE 2. It will be seen that the curve is like the sawtooth voltage of a relaxation generator, in contrast with that obtained with the previous arrangement. Consequently it is possible, in the same way as with a relaxation generator, simply to compare the arithmetic means of the gap voltage $u_f$ with a fixed reference voltage and to apply the difference as a control signal to the feed means. This considerably simplifies the entire construction of the spark erosion machine.

Finally, all these advantages are secured with an expenditure in means for the generator including its control means and feed regulation which does not exceed, and may even be smaller than, that needed in a conventional trigger circuit functioning without energy storage means.

Reference is now made to the figures of the drawing which illustrate the invention.

Figure 1:
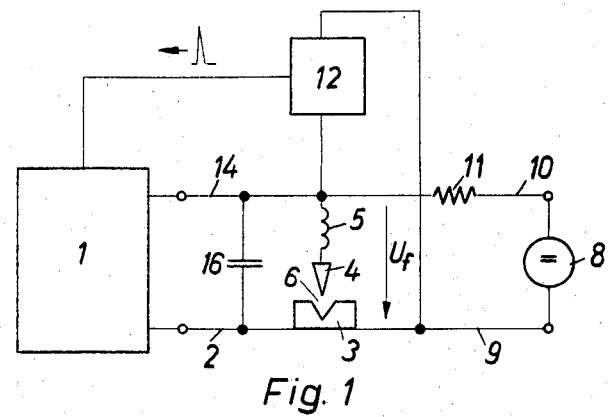
FIGURE 1 shows a control circuit of prior art whereby a voltage measuring circuit triggers the pulse generator when the voltage across the gap reaches a given value.
Figure 2:
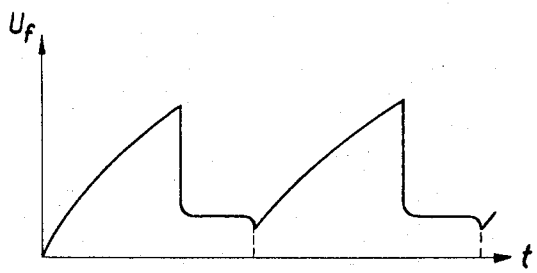
FIGURE 2 shows voltage across the working gap of the present invention as a function of time.
Figure 3:
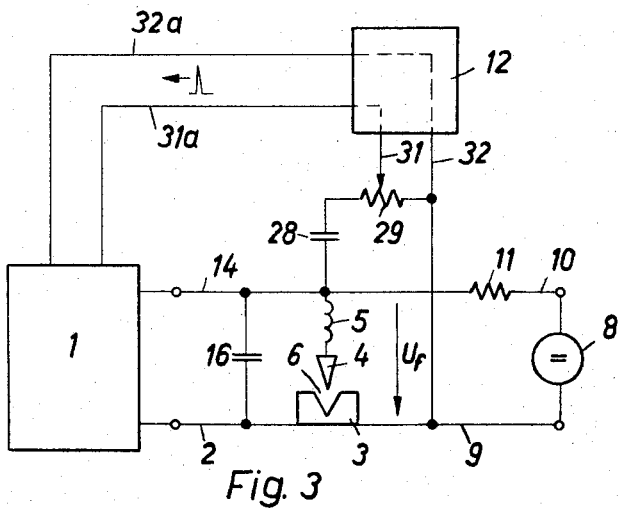
FIGURE 3 shows a control circuit of the present invention whereby a voltage surge, the magnitude of which indicates the presence or absence of a desired condition in the gap, is used to trigger the erosion pulse generator.

An embodiment of the invention is illustrated in FIGURE 3 of the accompanying drawings, in which a trigger pulse generator 1 is connected to the work 3 and the working electrode 4 through conductors 2 and 14 and the unavoidable inductance 5 in the discharging circuit. A source of direct current 8, which constitutes the test voltage source, is connected through a conductor 10 and a resistor 11 and through a conductor 9 to the poles of a capacitor 16, which may be constituted simply by the circuit capacitance. DC source 8 need not be a separate voltage source, and in many instances the principal voltage source inside the generator 1 may also perform the functions of the DC source 8. If the high power switch means contained in the trigger circuit have the form of transistors, resistor 11 need not necessarily be constituted by a separate component, since the blocking resistance of the transistors may perform the functions of resistor 11. However, in determining the value of resistor 11 consideration must be given to the necessity of avoiding raising to infinity the blocking resistance of the transistors which operates in the same direction as resistor 11. The effective value of resistor 11 is so chosen that the current in conductors 9 and 10 is insufficient to maintain an independent discharge across the working gap.

The arrangement functions as follows:

As soon as the working gap is deionized following a preceding discharge and its physical conditions are satisfactory, it ceases to short-circuit the capacitor 16. Consequently, the latter becomes charged through resistor 11. If a discharge takes place after a sufficiently high potential has been built up say $u_f=70$ volts, this means that the conditions in the working gap are suitable for erosion.

The consequent voltage surge is transmitted through the blocking capacitor 28 in the form of a needle-shaped pulse. A suitable portion of this pulse may be tapped from resistor 29 and applied to the measuring member 12 through conductors 31 and 32. This may usually consist of a simple amplitude filter having a defined threshold of response. It contains a biased amplifying stage and/or a Zener diode. A suitable Schmitt comparator circuit may also be useful in certain circumstances.

The measuring member 12 passes the needle-shaped pulse only if its amplitude exceeds a predetermined amplitude. The pulse which is transmitted through lines 31a and 32a triggers the fresh erosion pulse in generator 1.

In many instances the defined threshold of response of the control portion of the pulse generator 1 may perform the functions of the amplitude filter 12. If this is the case the lines 31 and 32 may be directly connected to the control portion of the pulse generator 1, as indicated in FIGURE 3 in dotted lines.

What is claimed is:
1. A control circuit for controlling the electrical eroding discharge across a spark eroding gap between a workpiece and a working electrode in a spark erosion machine comprising:
   a first resistor,
   a source of direct current voltage connected across said gap between said workpiece and said electrode via said first resistor for applying a voltage to said gap to cause an electrical discharge, said first resistor having a value so that said source cannot sustain an independent eroding discharge across said gap,
   electrical measuring means for receiving a voltage surge which is characteristic of a desired condition in said gap and for producing a given electrical signal provided the magnitude of said surge exceeds a given value indicating the presence of a desired condition in said gap,
   a serially connected capacitor and second resistor connected between said gap and said measuring means for producing said voltage surge when the voltage applied by said source across said gap causes a discharge, the magnitude of said surge being a function of the voltage across said gap at the time of said discharge, and the voltage across said gap at the time of discharge being an indication of the presence or absence of a desired condition in said gap, so that said given signal is produced only when said desired condition is present, and
   an erosion pulse generator connected across said gap and to said measuring means for causing an eroding discharge in said gap when said given electrical signal is produced by said measuring means indicating the presence of a desired condition in said gap.

2. A control circuit as in claim 1 wherein the resistance value of said second resistor is adjustable.

3. A control circuit as in claim 1 wherein said erosion pulse generator includes a monostable multivibrator for the generation of erosion pulses, said multivibrator including said measuring means.

4. A control circuit as in claim 1 in which the principal voltage source inside said erosion pulse generator is said source of direct current voltage.

5. A control circuit as in claim 1 including a second capacitor connected across said gap, said second capacitor being charged by said source to cause said discharge which cannot be sustained.

References Cited

UNITED STATES PATENTS

| 3,213,319 | 10/1965 | Inoue | 315—170 |
| 3,259,795 | 7/1966 | Schierholt | 315—173 |
| 3,267,327 | 8/1966 | Webb | 315—127 |
| 3,329,866 | 7/1967 | Webb | 315—124 |

JOHN W. HUCKERT, *Primary Examiner.*

R. SANDLER, *Assistant Examiner.*

U.S. Cl. X.R.

219—69; 328—115; 315—241, 242